US009992970B2

(12) United States Patent
Abbey et al.

(10) Patent No.: US 9,992,970 B2
(45) Date of Patent: Jun. 12, 2018

(54) TRAVELING FEEDING APPARATUS

(71) Applicants: Eric Abbey, East Brunswick, NJ (US); John James Stone, Golden, CO (US)

(72) Inventors: Eric Abbey, East Brunswick, NJ (US); John James Stone, Golden, CO (US)

(73) Assignees: LOVING PETS CORPORATION, Cranbury Township, NJ (US); GRAVITY PRODUCT DEVELOPMENT, LLC, Golden, CO (US)

( * ) Notice: Subject to any disclaimer, the term of this patent is extended or adjusted under 35 U.S.C. 154(b) by 40 days.

(21) Appl. No.: 14/987,092

(22) Filed: Jan. 4, 2016

(65) Prior Publication Data

US 2017/0071150 A1    Mar. 16, 2017

Related U.S. Application Data

(63) Continuation-in-part of application No. 14/852,007, filed on Sep. 11, 2015.

(51) Int. Cl.
*A01K 1/10*    (2006.01)
*A01K 5/00*    (2006.01)
*A01K 7/00*    (2006.01)

(52) U.S. Cl.
CPC . *A01K 5/00* (2013.01); *A01K 7/00* (2013.01)

(58) Field of Classification Search
CPC .... A01K 7/005; A01K 5/0121; A01K 5/0128; A01K 5/0135; A01K 7/00; A01K 5/0114; A47K 3/162; A47K 3/164; A47K 3/17; A47K 3/06; A47G 2019/2277; A47G 2012/002

USPC ........ 119/51.5, 51.01, 61.5, 61.56; 220/4.24; 206/546, 547

See application file for complete search history.

(56) References Cited

U.S. PATENT DOCUMENTS

| 4,257,353 | A | * | 3/1981 | Imhoff | A01K 5/0121 |
| | | | | | 119/61.56 |
| 5,636,594 | A | | 6/1997 | Pina | |
| 5,660,117 | A | | 8/1997 | Noble | |
| 5,752,464 | A | * | 5/1998 | King | A01K 5/0114 |
| | | | | | 119/51.5 |
| 5,823,136 | A | * | 10/1998 | Zarski | A01K 7/00 |
| | | | | | 119/51.5 |
| 6,443,096 | B1 | * | 9/2002 | Prydie | A01K 5/0114 |
| | | | | | 119/61.56 |
| 6,516,745 | B1 | * | 2/2003 | Spires | A01K 1/0353 |
| | | | | | 119/28.5 |
| 7,207,290 | B2 | * | 4/2007 | Nichols | A01K 5/0114 |
| | | | | | 108/116 |
| 7,263,949 | B1 | * | 9/2007 | Seaford | A01K 5/0114 |
| | | | | | 119/51.5 |
| D571,614 | S | | 6/2008 | Curtin | |
| D577,466 | S | | 9/2008 | Shamoon | |
| D582,101 | S | | 12/2008 | Shamoon | |
| D584,110 | S | | 1/2009 | Hauser | |
| D597,262 | S | | 7/2009 | Shamoon et al. | |
| D611,769 | S | | 3/2010 | Hauser | |
| D618,862 | S | | 6/2010 | Shamoon et al. | |

(Continued)

*Primary Examiner* — Kristen C Hayes
(74) *Attorney, Agent, or Firm* — Standley Law Group LLP

(57) ABSTRACT

The present invention is directed to a portable feeding apparatus or bowl, more particularly to a travel feeding apparatus for pets having a collapsible bowl for holding food and water and legs that fold-in for easy storage.

14 Claims, 9 Drawing Sheets

(56) References Cited

U.S. PATENT DOCUMENTS

| | | | |
|---|---|---|---|
| D645,705 S | 9/2011 | Shamoon | |
| 8,051,514 B2* | 11/2011 | Yarmer | A47G 9/1045 |
| | | | 108/43 |
| D665,541 S* | 8/2012 | Shamoon | D30/121 |
| 8,490,551 B1 | 7/2013 | Wagner et al. | |
| 8,607,375 B2* | 12/2013 | Yeung | A47K 3/064 |
| | | | 4/585 |
| D773,126 S* | 11/2016 | Scaba | D30/129 |
| 9,545,176 B1* | 1/2017 | Finell et al. | A47K 3/06 |
| | | | 4/495 |
| 2002/0083900 A1* | 7/2002 | Williams | A01K 5/0114 |
| | | | 119/51.01 |
| 2006/0130769 A1* | 6/2006 | Nichols | A01K 5/0114 |
| | | | 119/58 |
| 2007/0251874 A1 | 11/2007 | Stewart | |
| 2009/0199775 A1* | 8/2009 | Shamoon | A01K 5/0114 |
| | | | 119/61.56 |
| 2009/0235458 A1 | 9/2009 | Yarmer et al. | |
| 2010/0140279 A1 | 6/2010 | Tyson et al. | |
| 2014/0261203 A1* | 9/2014 | Renforth | A01K 5/0114 |
| | | | 119/61.56 |
| 2016/0249584 A1* | 9/2016 | Yibao | A01K 7/00 |

* cited by examiner

TRAVELING FEEDING APPARATUS

This application is a continuation-in-part of U.S. application Ser. No. 14/852,007, filed Sep. 11, 2015, which is hereby incorporated by reference in its entirety.

BACKGROUND OF THE INVENTIVE FIELD

The present invention is directed to a portable feeding apparatus or bowl, more particularly to a travel feeding apparatus having a collapsible bowl for food and water with fold out legs.

Although collapsible feeding bowls are known in the art, the present invention is novel in that it provides a unique combination of features that provides a portable dual-bowl feeding/drinking apparatus while also allowing for the storage and transport of food and/or water or other liquids. The present invention provides for a highly flexible, compactable and convenient apparatus for storing food/liquid, carrying food/liquid, and feeding not previously known in the art.

SUMMARY OF THE GENERAL INVENTIVE CONCEPT

The present invention relates to a portable, traveling feeding apparatus, preferably comprised of a first collapsible bowl, the first collapsible bowl supported by a frame portion having a handle, hinged to a second collapsible bowl, the second collapsible bowl supported by a frame portion having a handle. The portable bowl of the present invention preferably has a lock portion for locking the first and second bowls in the closed position.

The portable, traveling feeding apparatus of the present invention preferably has two bowl portions, one bowl for holding food, the other bowl for holding water. In the preferred embodiment of the invention, the first and second bowl portions are collapsible from a closed to expanded position when in use. The bowls can be placed in the collapsed position for traveling or storage as the bowls take up less space when in the collapsed position. With the hinge in the closed position and the bowls in the collapsed position (e.g., traveling state), the portable feeding apparatus of the present invention can be stored in a fairly small space, e.g., in a cupboard, drawer, or traveling bag. In another embodiment, the travel bowl has one collapsible bowl instead of two.

The collapsible feeding bowl of the present invention can also be configured with fold out legs that fold into the rim or frame around the bowl or bowls (depending on whether there is one bowl or two bowls). The legs are preferably in a curved shape corresponding to the shape of the bowl rim or frame. The legs preferably fold into a groove or indent portion of the bowl rim or frame.

The foregoing and other features and advantages of the present invention will be apparent from the following more detailed description of the particular embodiments, as illustrated in the accompanying drawings.

BRIEF DESCRIPTION OF THE DRAWINGS

The following detailed description of the example embodiments refers to the accompanying figures that form a part thereof. The detailed description provides explanations by way of exemplary embodiments. It is to be understood that other embodiments may be used having mechanical and electrical changes that incorporate the scope of the present invention without departing from the spirit of the invention.

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
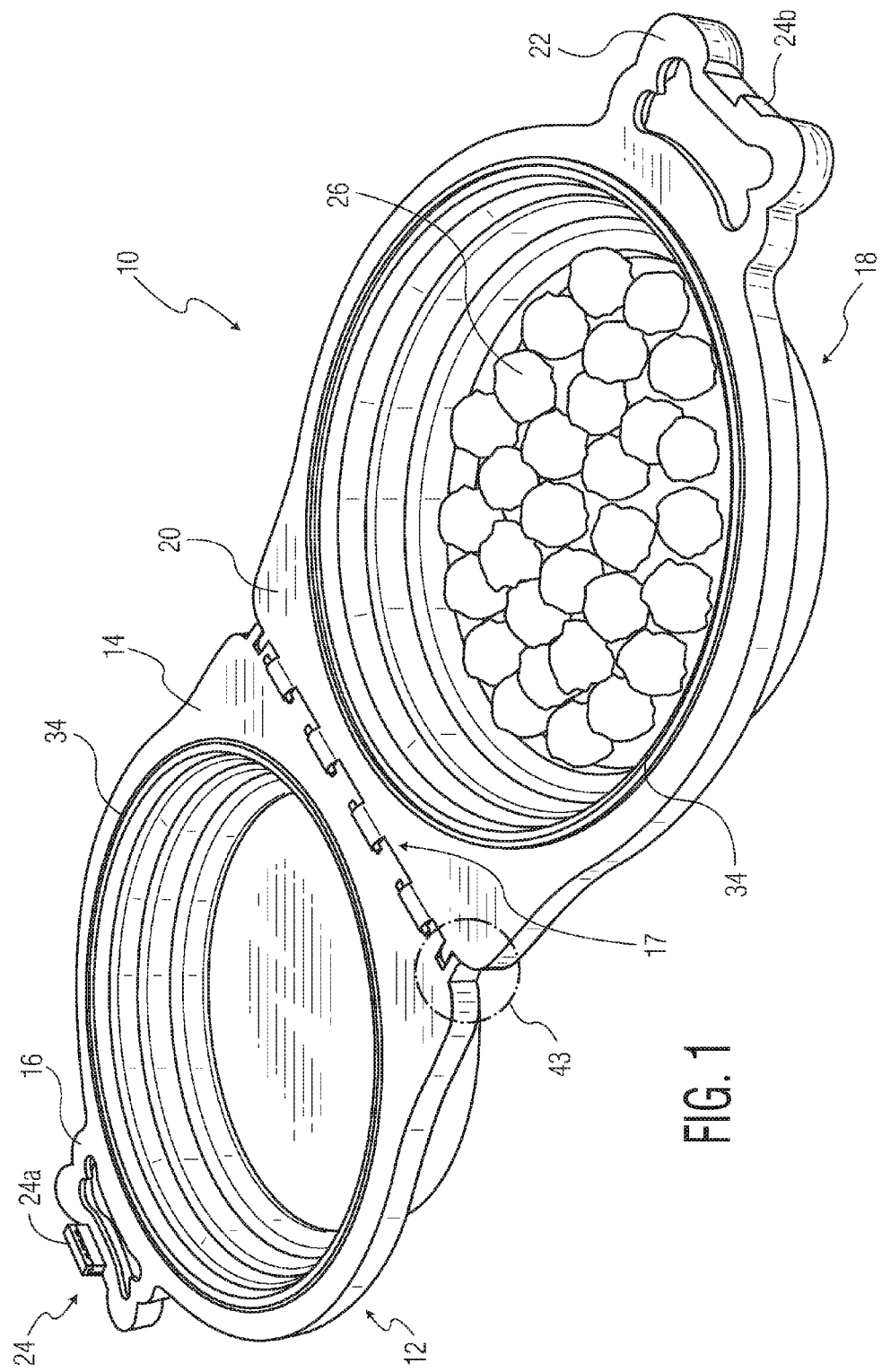
FIG. 1 illustrates one embodiment of the portable feeding apparatus of the present invention.

FIG. 1 illustrates one embodiment of the portable feeding apparatus 10 of the present invention. The present invention relates to a portable, traveling feeding apparatus, preferably comprised of a first collapsible bowl 12, the first collapsible bowl supported by a frame portion 14 and a handle 16, hinged 17 to a second collapsible bowl 18, the second collapsible bowl supported by a frame portion 20 and a handle 22. The portable apparatus of the present invention preferably has a lock or fastener portion 24 for holding the first and second bowls in the closed position. Reference numeral 43 refers to the dotted circle portion that is blown up as FIG. 7.

The portable feeding apparatus of the present invention preferably has two bowl portions: one bowl for holding food, the other bowl for holding water. In the preferred embodiment, of the invention, the first and second bowl portions can be moved from a closed position to an expanded position when in use. FIG. 1 shows the bowls in open-hinged position with the bowls expanded ready for use. Food, shown generally at 26, can be placed in one of the bowls and water can be placed in the other bowl.

In the preferred embodiment, the diameter of the bowls are the same size so that the openings of the bowls mate with each other when the apparatus is in the closed position. Thus, when in the closed position, the rims and/or frames of each of the bowls are disposed against each other thus forming a seal to lock in the contents of the bowl in the apparatus. For example, see FIGS. 2 and 3 showing the frames/rims disposed against each other when the apparatus is in the closed position so that any contents in the bowl portions are sealed in the apparatus.

Figure 2:
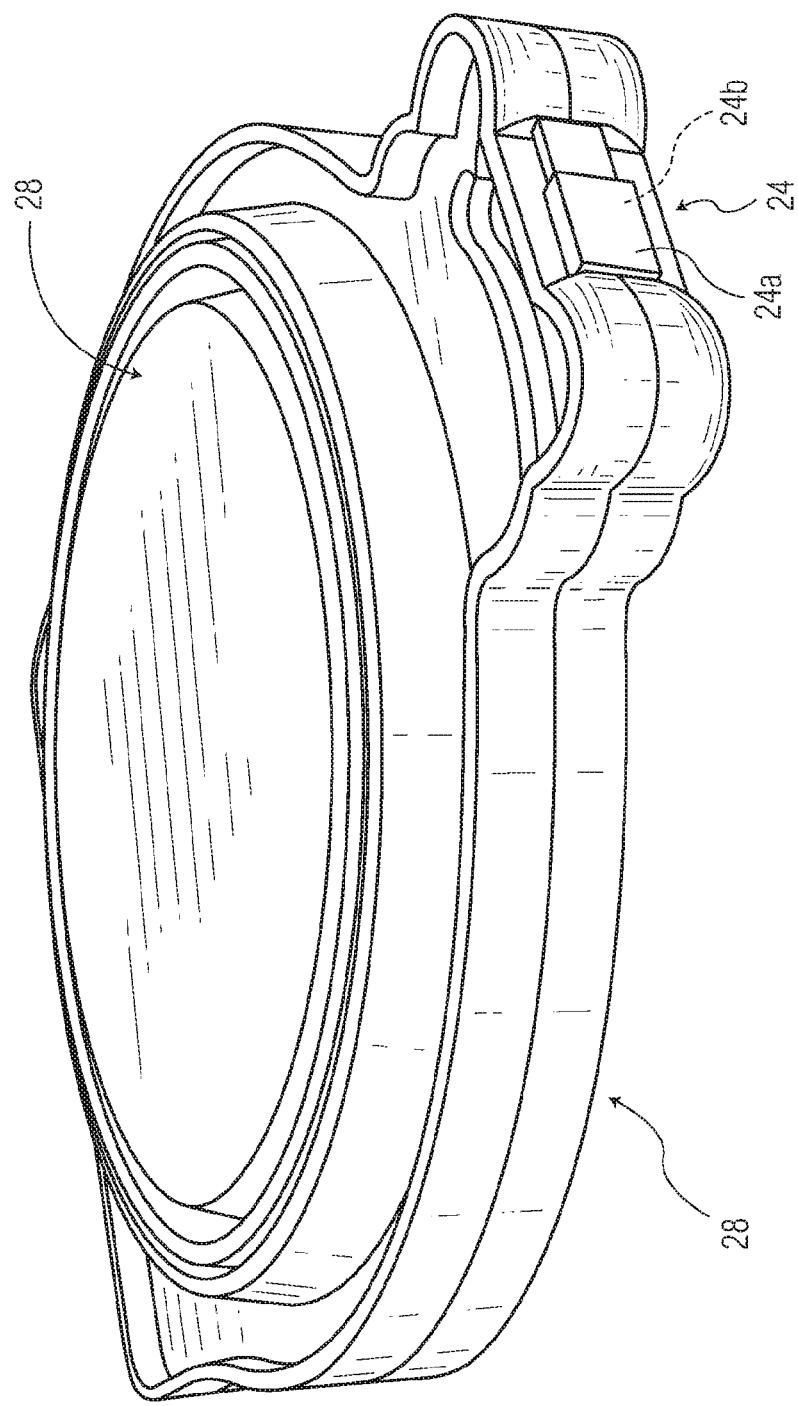
FIG. 2 illustrates the feeding apparatus of FIG. 1 in the closed and collapsed position and having a slide lock.

FIG. 2 illustrates the feeding apparatus of FIG. 1 in the closed and collapsed position and having a slide lock 24a, 24b. In this figure, both bowls are placed in the collapsed position (shown generally at 28) for traveling or storage as the bowls take up less space when in the collapsed position. As illustrated, the first and second collapsible bowls have openings that are disposed next to each other when the apparatus is in the closed position. With the hinge in the closed position and the bowls in the collapsed position (e.g., storage state), the portable feeding apparatus of the present invention can be stored in a fairly small space, e.g., in a cupboard, drawer, or traveling bag.

In this embodiment, the handle is comprised of two half portions 16, 22—each half attached to one of the bowl portions respectively. When the feeding apparatus is closed, both halves of the handle come together to form the complete handle. The slide lock is comprised of a slide portion 24a on one of the halves of the handle that the user can slide over a matching protrusion piece 24b on the other half of the handle to lock the apparatus in the closed position.

Figure 3:
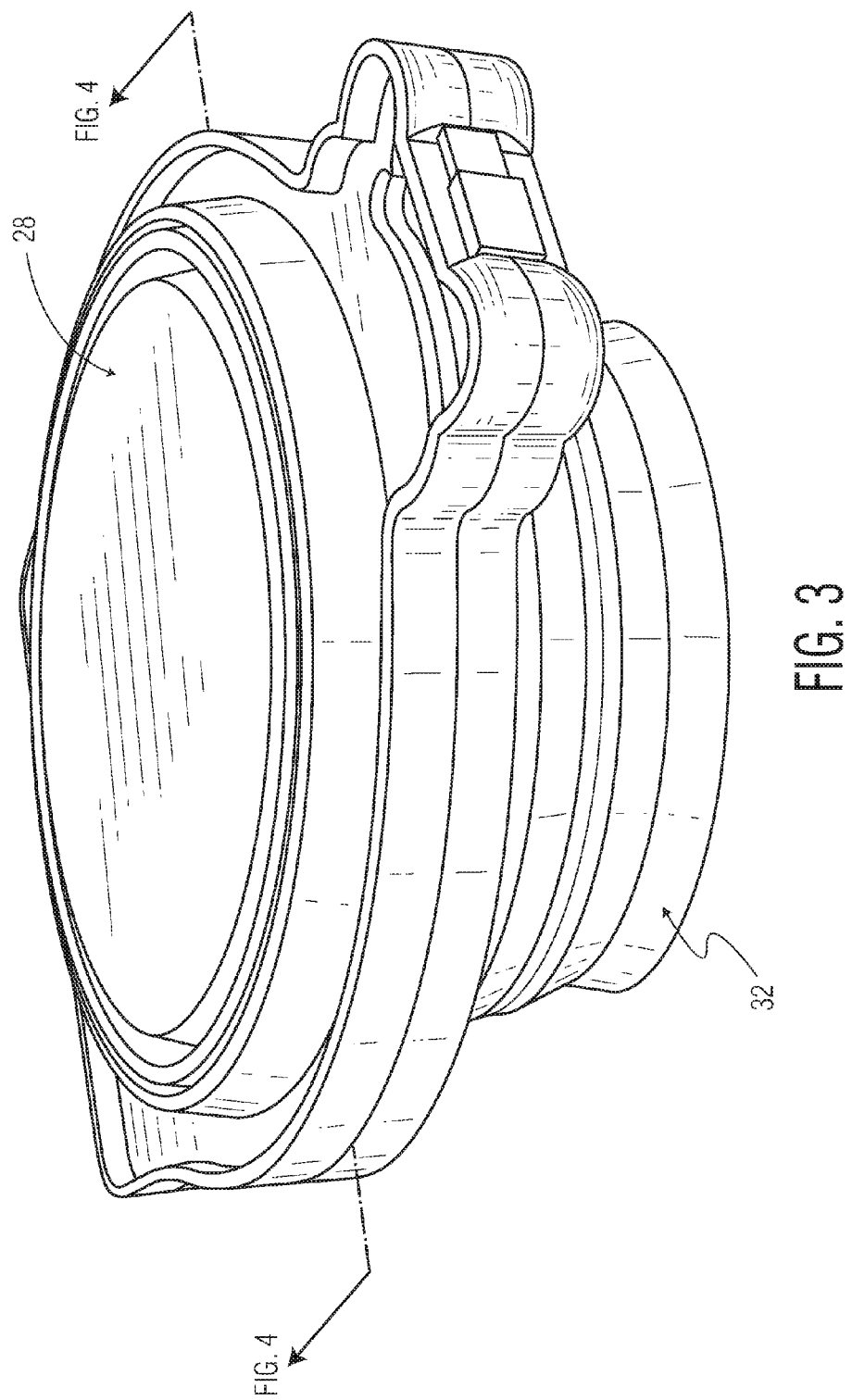
FIG. 3 illustrates the feeding apparatus of FIG. 1 in the closed position where one of the bowls is in the collapsed position and the other bowl is in the expanded position.

FIG. 3 illustrates the feeding apparatus of FIG. 1 in the closed position where one of the bowls is in the collapsed position and the other bowl is in the expanded position. In this closed position, the lock can be positioned to hold the feeding apparatus in the closed position. In this closed position, with one of the bowls in the expanded position (shown generally at 32), food can be stored in the apparatus. For example, pet food can be stored in the expanded bowl for traveling purposes. When the user is ready to feed the pet (for example at a rest stop at a highway), the user can then open the feeding apparatus, expand the other bowl and place water in it. In this way, the feeding apparatus of the present invention can be used as a food storage and carrying device.

Figure 4:
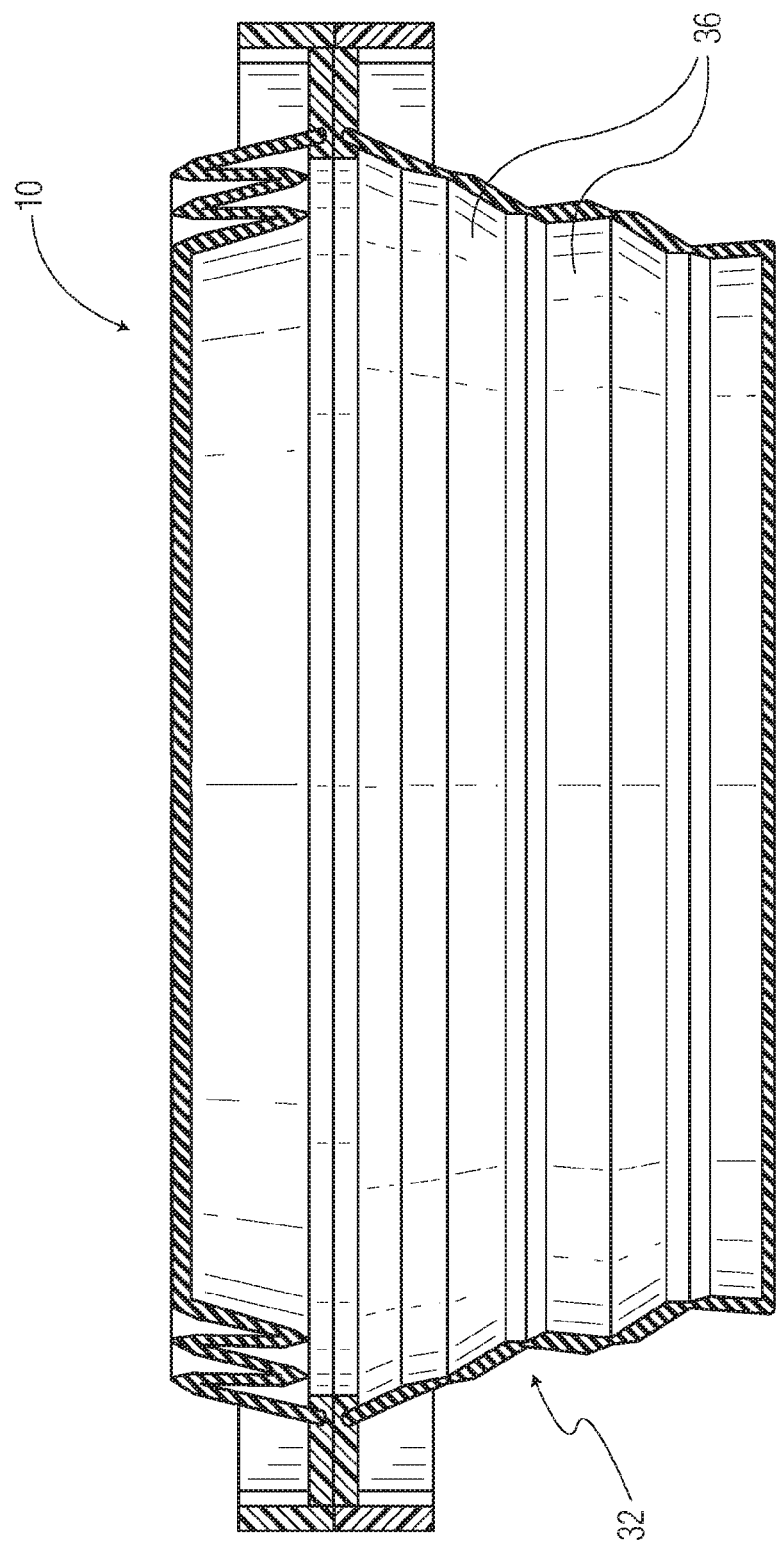
FIG. 4 illustrates a cross-section view of the bowl of FIG. 3.

FIG. 4 illustrates a cross-section view of the bowl of FIG. 3. It is appreciated that one of ordinary skill in the art would understand how to configure the bowls to provide the ability to collapse or expand the bowl. For example, as illustrated, in this embodiment the bowls are comprised of flexible, plastic or elastomeric membranes 36 that permit the collapsing or "squishing" of the bowls. As illustrated, the bowls are comprised of stacked layers of these annular shaped rings that have diameters that decrease in size allowing the bowls to be collapsed and expanded as needed.

Figure 5:
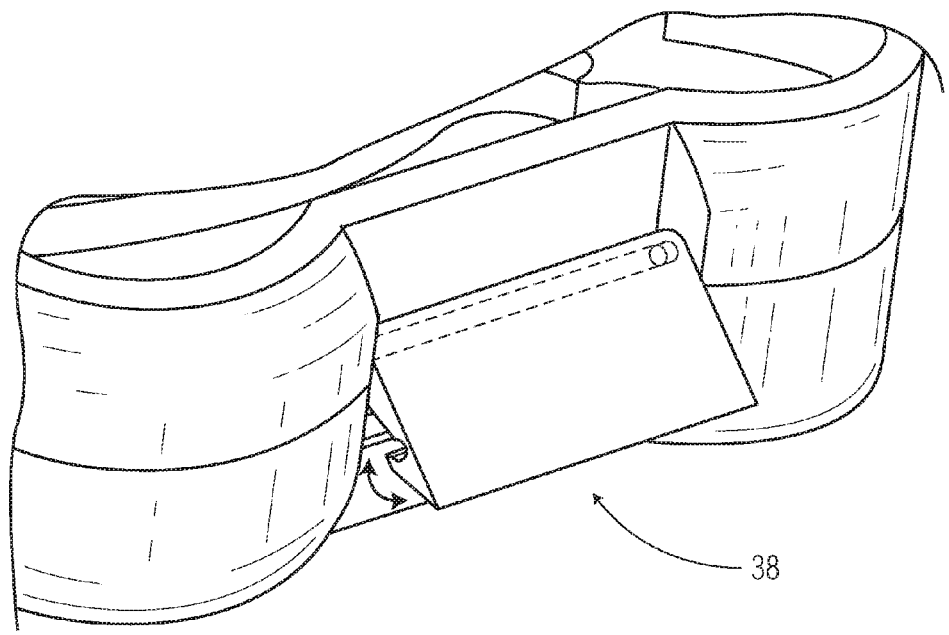
FIG. 5 illustrates one embodiment of the hinged lock.
Figure 6:
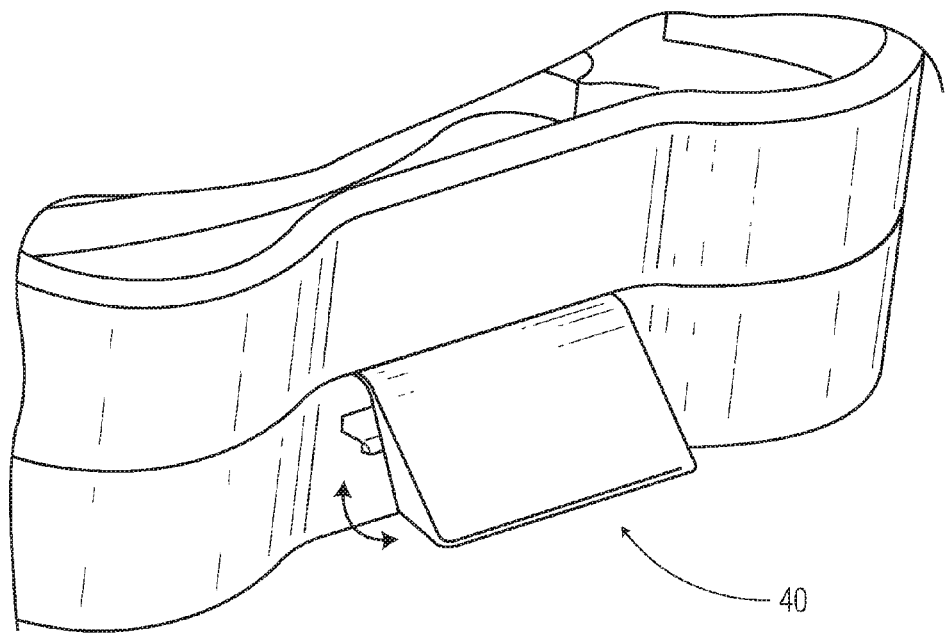
FIG. 6 illustrates one embodiment of the molded lock.

Once the portable feeding apparatus of the present invention is closed, the lock portion can be locked to keep it in the closed position. FIG. 5 illustrates one alternate embodiment showing a hinged lock 38. FIG. 6 illustrates another alternate embodiment showing a molded lock 40. "Fastener" or "lock" as used herein means the ability to keep the apparatus in the closed position (e.g., the bowls are held shut) until it is undone and should not be so narrowly construed to be limited to a "key-type" lock.

Figure 7:
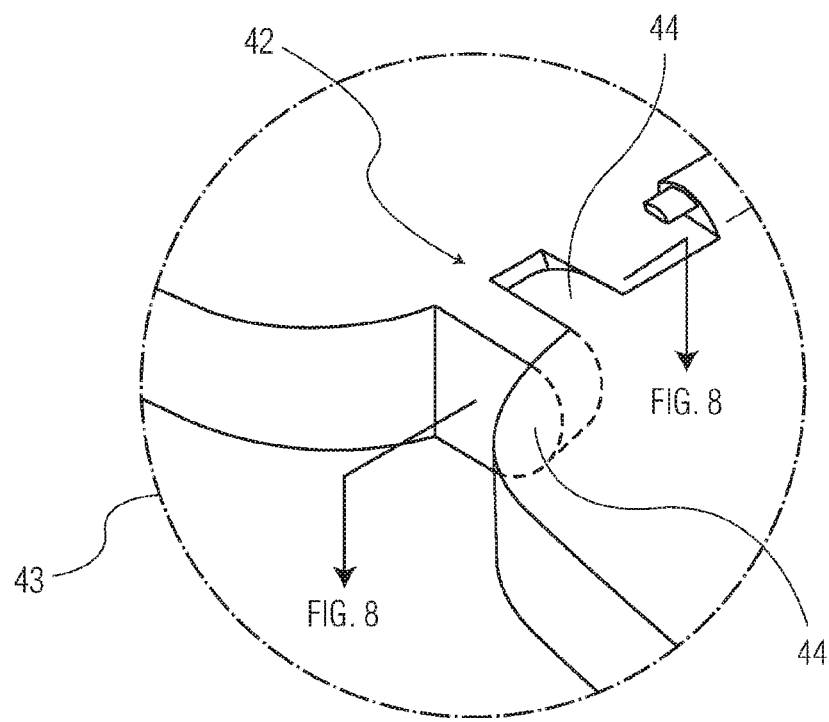
FIG. 7 illustrates a close-up view of the stop mechanism.
Figure 8:
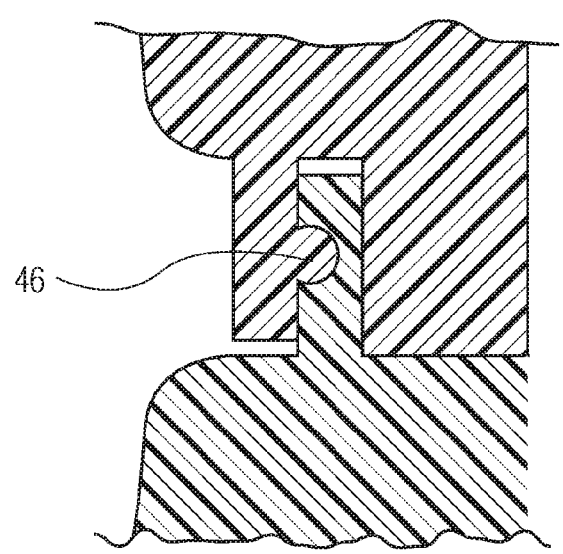
FIG. 8 illustrates a cross-section view of the stop mechanism of FIG. 7.

FIG. 7 illustrates a close-up view of one embodiment of the stop mechanism 42 of the present invention. FIG. 8 illustrates a cross-section view of the stop mechanism of FIG. 7. In this embodiment, this stop mechanism is comprised of interlocking members 44 of the frame portions of the first and second bowl portions, respectively. One of the interlocking members of the stop mechanism has a small bump, protrusion or member 46 (e.g., in a rounded "ball" shape) with a matching socket molded for accepting a ball, bump or protrusion member. In the preferred embodiment, there are two stop mechanisms, placed just outside to the right and left of the hinge portions. These stop mechanisms create a "click" and locking effect so that when the portable feeding apparatus is opened for use, the bump will "click" into the socket and the apparatus will be held in the open position and will resist the hinges natural instinct to fold. To close the portable bowl, a user would grab both halves (i.e., first and second bowl sections) and apply a slight pressure to get the ball to release from the socket on either side in order to fold the portable bowl back up to the closed position.

Figure 9:
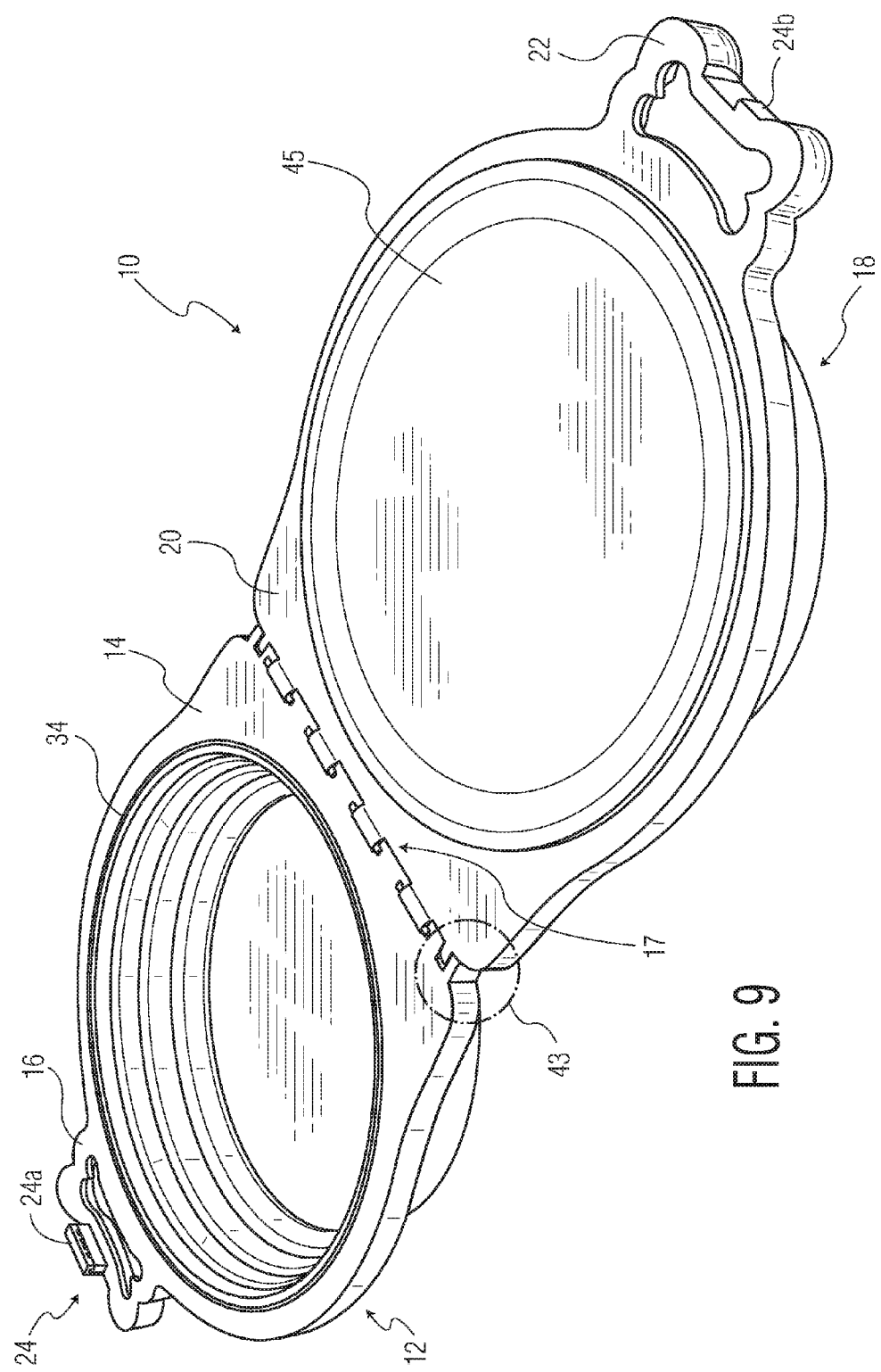
FIG. 9 illustrates the feeding apparatus of FIG. 1 with a lid over one bowl portion.

In an alternate embodiment, lids can be provided for one or both bowls to keep food or water stored in the bowls from spilling out. In this embodiment, water and food can be stored and carried in the portable feeding apparatus of the present invention. In one embodiment, the lids are plastic and can be securely held in place by each of the rims 34 of the bowls, respectively. FIG. 9 illustrates the feeding apparatus of FIG. 1 with a lid 45 over one bowl portion.

Figure 10:
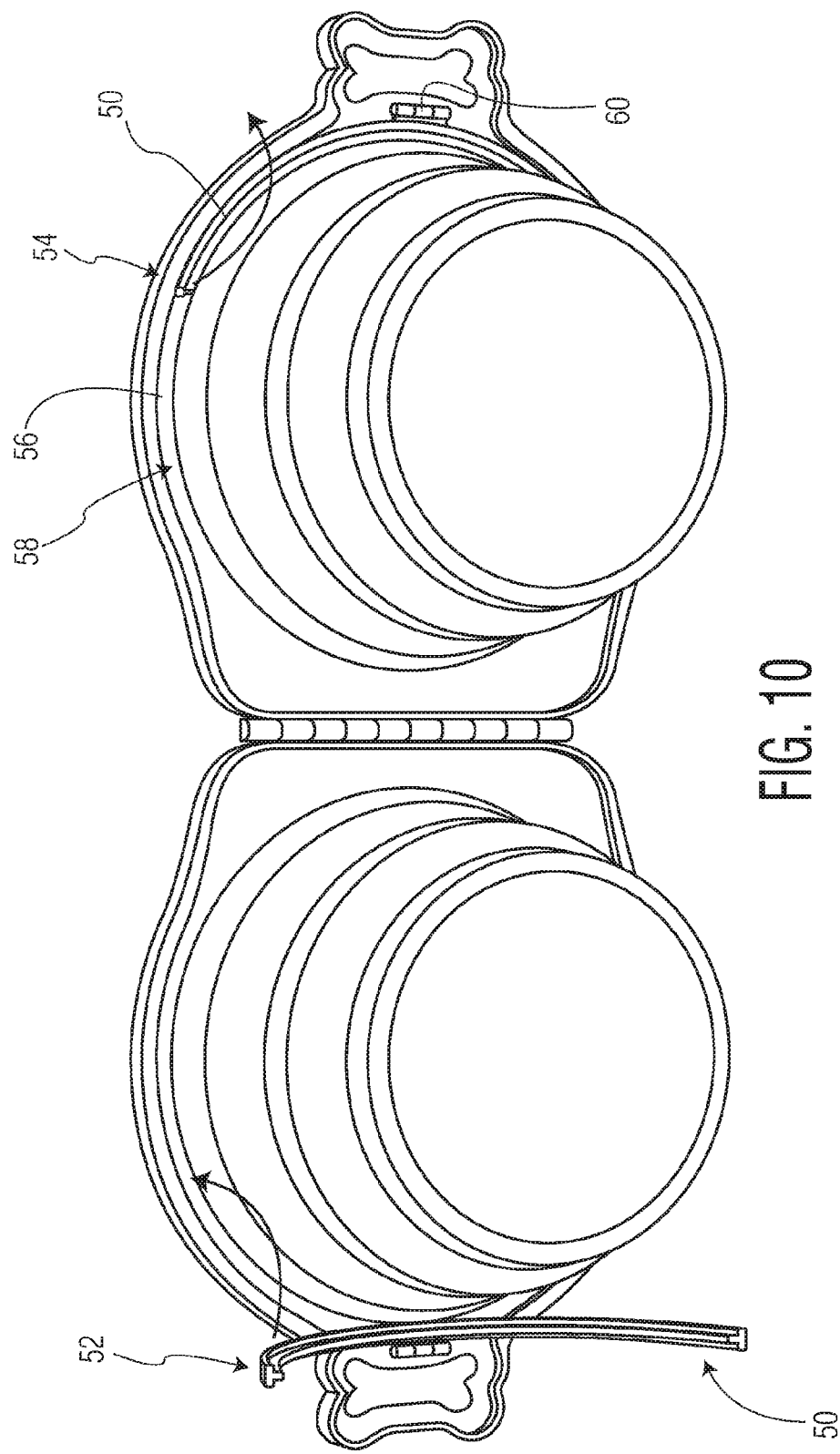
FIG. 10 illustrates the fold-out legs on a dual bowl configuration.
Figure 11:
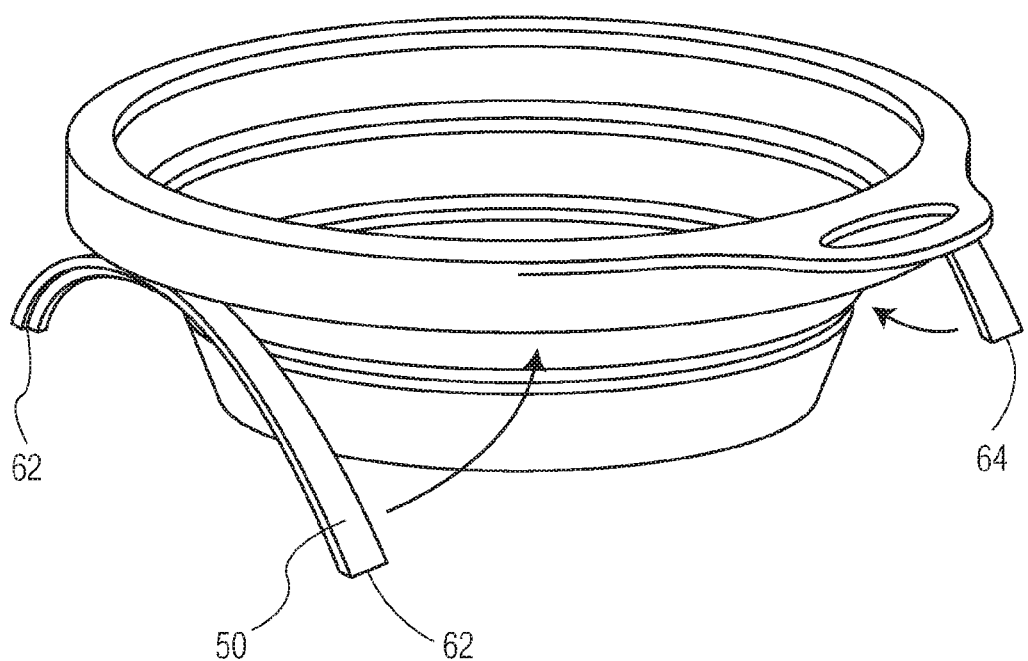
FIG. 11 illustrates the fold-out legs on a single bowl configuration.

The collapsible feeding bowl of the present invention can be configured with fold out legs that fold into the rim or frame around the bowl or bowls (depending on whether there is one bowl or two bowls). FIG. 10 and FIG. 11 illustrate the fold-out legs of the bowl of the present invention. FIG. 10 illustrates a bottom view of the fold-out legs 50 on a dual bowl figuration. FIG. 11 illustrates the fold-out legs on a single bowl configuration. In FIG. 10 one of the legs is shown in a folded-out position (shown generally at 52) and one leg is shown in a folded-in position (shown generally at 54). The legs are preferably in a curved shape corresponding to the shape of the bowl rim or frame (shown generally at 58). The legs preferably fold into a groove or indent portion 56 of the bowl rim or frame. The legs are preferably attached at a hinged portion 60 to allow the legs to fold in and out.

In one embodiment, the first leg is comprised of a first and second end 62; and the second leg is comprised of a first and second end 64. The first and second ends of the first and second legs can be configured with rubber stops to prevent the bowl from sliding on a slippery floor.

While certain embodiments of the present invention are described in detail above, the scope of the invention is not to be considered limited by such disclosure, and modifications are possible without departing from the spirit of the invention as evidenced by the following claims.

What is claimed is:

1. A portable feeding apparatus, comprising:
   a first collapsible bowl having a rim having a first curvature, wherein the rim has an indent portion;
   a second collapsible bowl having a rim having a second curvature matching the first curvature, wherein the rim has an indent portion;
   a first leg formed in a curved shaped having a curvature matching the rim of the first collapsible bowl, the curved shape of the first leg having an apex portion, and wherein the first leg is hingedly attached to the apparatus at the apex portion of the curved shape of the first leg for folding in and out of the indent portion in the rim of the first collapsible bowl;
   a second leg formed in a curved shaped having a curvature matching the rim of the second collapsible bowl, the curved shape of the second leg having an apex portion, and wherein the second leg is hingedly attached to the apparatus at the apex portion of the curved shape of the second leg for folding in and out of the indent portion in the rim of the second collapsible bowl;
   a hinge for hingably closing the first and second collapsible bowls together;
   a fastener for holding the first and second collapsible bowls to each other when the feeding apparatus is in a closed position;
   a handle operationally connected to at least one bowl for carrying the apparatus;
   wherein the first and second collapsible bowls are adapted to be expanded to hold food or water and collapsed to conserve space;
   wherein the feeding apparatus is adapted to be opened for feeding use and closed when not in use; and wherein the first and second collapsible bowls have openings and wherein the openings of the first and second collapsible bowls are disposed next to each other when the feeding apparatus is in the closed position to form a seal to lock in contents of at least one of the bowls for storage when the feeding apparatus is closed and when one of the bowls is in the expanded position.

2. A portable feeding apparatus according to claim 1, where the handle is directly connected to one of the bowls.

3. A portable feeding apparatus according to claim 1, further comprising:
a stop mechanism for holding the apparatus in a predetermined open position for use.

4. A portable feeding apparatus according to claim 1, wherein the fastener is a sliding fastener.

5. A portable feeding apparatus according to claim 1, wherein the fastener is a hinged fastener.

6. A portable feeding apparatus according to claim 1, wherein the first and second legs are in a curved shape corresponding to the shape of the rims of the first and second bowls.

7. A portable feeding apparatus, comprising:
a first collapsible bowl having a rim having a first curvature, wherein the rim has an indent portion;
a first leg formed in a curved shaped having a curvature matching the rim of the first collapsible bowl, the curved shape of the first leg having an apex portion, and wherein the first leg is hingedly attached to the apparatus at the apex portion of the curved shape of the first leg for folding in and out of the indent portion in the rim of the first collapsible bowl;
a second leg formed in a curved shaped having a curvature matching the rim of the first collapsible bowl, the curved shape of the second leg having an apex portion, and wherein the second leg is hingedly attached to the apparatus at the apex portion of the curved shape of the second leg for folding in and out of the indent portion in the rim of the first collapsible bowl; and
a handle operationally connected to the first bowl for carrying the apparatus;
wherein the first collapsible bowl is adapted to be expanded to hold food or water and collapsed to conserve space.

8. A portable feeding apparatus according to claim 7, wherein the apparatus is in a substantially flat configuration when the bowl is collapsed and the first and second legs are folded into the indent portion allowing for easy storage or transport.

9. A portable feeding apparatus according to claim 7, wherein the first leg is comprised of a first and second end; and wherein the second leg is comprised of a first and second end; and wherein the apparatus is further comprised of rubber stops on the first and second ends of the first and second legs.

10. A portable feeding apparatus, comprising:
a first collapsible bowl having a rim having a first curvature;
a second collapsible bowl having a rim having a second curvature matching the first curvature;
a hinge for hingably closing the first and second collapsible bowls together;
a fastener for holding the first and second collapsible bowls to each other when the feeding apparatus is in a closed position;
wherein the first and second collapsible bowls are adapted to be expanded to hold food or water and collapsed to conserve space;
wherein the feeding apparatus is adapted to be opened for feeding use and closed when not in feeding use;
wherein the first and second collapsible bowls have openings and wherein the openings of the first and second collapsible bowls are disposed next to each other when the feeding apparatus is in the closed position to form a seal to lock in contents of at least one of the bowls for storage when the feeding apparatus is closed and when one of the bowls is in the expanded position.

11. A portable feeding apparatus according to claim 10, wherein the rim of the first collapsible bowl has an indent portion, and wherein the rim of the second collapsible bowl has an indent portion, the apparatus further comprising:
a handle operationally connected to at least one bowl for carrying the apparatus;
a first leg formed in a curved shape having a curvature matching the rim of the first collapsible bowl, the curved shape of the first leg having an apex portion, and wherein the first leg is hingedly attached to the apparatus at the apex portion of the curved shape of the first leg for folding in and out of the indent portion in the rim of the first collapsible bowl; and
a second leg formed in a curved shape having a curvature matching the rim of the second collapsible bowl, the curved shape of the second leg having an apex portion, and wherein the first leg is hingedly attached to the apparatus at the apex portion of the curved shape of the second leg for folding in and out of the indent portion in the rim of the second collapsible bowl.

12. A portable feeding apparatus according to claim 10, wherein the openings of the first and second collapsible bowls mate with each other when the portable feeding apparatus is in the closed position.

13. A portable feeding apparatus according to claim 10, further comprising:
a handle directly connected to one of the bowls.

14. A portable feeding apparatus according to claim 10, wherein the seal is watertight.

* * * * *